United States Patent
Ali et al.

(10) Patent No.: US 9,535,710 B2
(45) Date of Patent: *Jan. 3, 2017

(54) COMMUNICATION WITH A VIRTUAL TRUSTED RUNTIME BIOS

(71) Applicant: HEWLETT-PACKARD DEVELOPMENT COMPANY, L.P., Houston, TX (US)

(72) Inventors: Valiuddin Y. Ali, Cypress, TX (US); Jose Paulo Xavier Pires, Porto Alegre (BR); James M. Mann, Cypress, TX (US); Boris Balacheff, Lyons (FR); Chris I. Dalton, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,758

(22) Filed: Feb. 16, 2016

(65) Prior Publication Data

US 2016/0162299 A1    Jun. 9, 2016

Related U.S. Application Data

(63) Continuation of application No. 14/238,729, filed as application No. PCT/US2011/054045 on Sep. 29, 2011, now Pat. No. 9,275,230.

(30) Foreign Application Priority Data

Aug. 30, 2011   (WO) ................ PCT/US2011/049677

(51) Int. Cl.
*H04L 29/06*   (2006.01)
*G06F 9/44*   (2006.01)
(Continued)

(52) U.S. Cl.
CPC ......... *G06F 9/4401* (2013.01); *G06F 9/45541* (2013.01); *G06F 9/45558* (2013.01);
(Continued)

(58) Field of Classification Search
CPC .................................................... G06F 9/4401
See application file for complete search history.

(56) References Cited

U.S. PATENT DOCUMENTS 5,230,052 A * 7/1993 Dayan ................ H04L 29/06
713/2
5,574,920 A   11/1996 Parry
(Continued)

FOREIGN PATENT DOCUMENTS

CN   101599025   12/2009
CN   101739283   6/2010
(Continued)

OTHER PUBLICATIONS

Krautheim, F. John, Dhananjay S. Phatak, and Alan T. Sherman. "Introducing the trusted virtual environment module: a new mechanism for rooting trust in cloud computing." Trust and Trustworthy Computing. Springer Berlin Heidelberg, 2010. 211-227.*
(Continued)

*Primary Examiner* — Shawnchoy Rahman
(74) *Attorney, Agent, or Firm* — HP Inc. Patent Deparment (57) ABSTRACT

A secure communication channel is established between a virtual trusted runtime basic input output system (BIOS) and a virtual machine that includes a virtual BIOS. The virtual trusted runtime BIOS communicates with the virtual machine according to a web-based protocol over the secure communication channel using a secure socket layer.

20 Claims, 4 Drawing Sheets

(51) Int. Cl.
*G06F 9/455* (2006.01)
*G06F 21/57* (2013.01)

(52) U.S. Cl.
CPC ............ *G06F 21/57* (2013.01); *G06F 21/572* (2013.01); *G06F 21/575* (2013.01); *G06F 2009/45587* (2013.01)

(56) References Cited

U.S. PATENT DOCUMENTS

| | | | | |
|---|---|---|---|---|
| 5,844,986 | A * | 12/1998 | Davis | G06F 21/572 |
| | | | | 713/187 |
| 6,003,065 | A | 12/1999 | Yan et al. | |
| 7,380,136 | B2 * | 5/2008 | Zimmer | G06F 21/575 |
| | | | | 713/193 |
| 7,418,584 | B1 | 8/2008 | Klaiber et al. | |
| 7,581,219 | B2 | 8/2009 | Neiger et al. | |
| 7,840,398 | B2 | 11/2010 | Zimmer et al. | |
| 8,064,605 | B2 * | 11/2011 | Brutch | G06F 21/57 |
| | | | | 380/277 |
| 8,286,164 | B2 * | 10/2012 | Hall | G06F 9/45533 |
| | | | | 711/6 |
| 8,429,276 | B1 | 4/2013 | Kumar et al. | |
| 8,473,947 | B2 * | 6/2013 | Goggin | G06F 3/061 |
| | | | | 718/1 |
| 8,719,817 | B2 * | 5/2014 | Aswani | G06F 9/45558 |
| | | | | 718/1 |
| 8,977,842 | B1 | 3/2015 | McCorkendale et al. | |
| 9,069,591 | B1 * | 6/2015 | Beloussov | G06F 9/45558 |
| 2006/0005188 | A1 | 1/2006 | Vega et al. | |
| 2008/0163209 | A1 * | 7/2008 | Rozas | G06F 9/45558 |
| | | | | 718/1 |
| 2008/0256637 | A1 | 10/2008 | Liu et al. | |
| 2009/0044187 | A1 * | 2/2009 | Smith | G06F 21/57 |
| | | | | 718/1 |
| 2009/0125901 | A1 | 5/2009 | Swanson | |
| 2009/0165117 | A1 * | 6/2009 | Brutch | G06F 21/629 |
| | | | | 726/14 |
| 2010/0199062 | A1 | 8/2010 | Sancho-Dominguez | |
| 2010/0199276 | A1 | 8/2010 | Umbehocker | |
| 2011/0061046 | A1 | 3/2011 | Phillips | |
| 2011/0072254 | A1 | 3/2011 | Kuang et al. | |
| 2011/0126194 | A1 * | 5/2011 | Huynh | H04L 63/0227 |
| | | | | 718/1 |
| 2011/0296411 | A1 * | 12/2011 | Tang | G06F 9/45545 |
| | | | | 718/1 |
| 2014/0208442 | A1 * | 7/2014 | Mooring | G06F 9/45533 |
| | | | | 726/30 |
| 2014/0250294 | A1 * | 9/2014 | Ali | G06F 9/4401 |
| | | | | 713/2 |

FOREIGN PATENT DOCUMENTS

| | | |
|---|---|---|
| CN | 101957900 | 1/2011 |
| JP | 2005-143120 | 6/2005 |
| JP | 2005-529401 | 9/2005 |
| JP | 2006-252554 | 9/2006 |
| JP | 2007-213465 | 8/2007 |
| JP | 2008-523511 | 7/2008 |
| JP | 2009-508183 | 2/2009 |
| JP | 2009-176213 | 8/2009 |
| JP | 2009-230433 | 10/2009 |
| JP | 2011-076505 | 4/2011 |
| JP | 2011-145776 | 7/2011 |
| TW | 405091 | 9/2000 |
| TW | 200810485 A | 2/2008 |

OTHER PUBLICATIONS

Li Xiao-Yong, et al. "A trusted computing environment model in cloud architecture." Machine Learning and Cybernetics (ICMLC), 2010 International Conference on. vol. 6. IEEE, 2010.*

Zhang, Xinwen, Francesco Parisi-Presicce, and Ravi Sandhu. "Towards remote policy enforcement for runtime protection of mobile code using trusted computing." International Workshop on Security. Springer Berlin Heidelberg, 2006.*

Cavalli et al.; "2.1 Virtualization5," <http://phyweb.lbl.gov/atlaswiki/images/d/d7/VML-report-09-01-23.pdf>, Sep. 1, 2013 (43 pages).

Garfinkel, "Terra: A Virtual Machine-Based Platform for Trusted Computing" SIGOPS Operating System Review V37(5), ACM 2003 (14 pages).

Haldar et al., "Semantic remote attestation: a virtual machine directed approach to trusted computing," USENIX Virtual Machine Research and Technology Symposium, vol. 2004 (11 pages).

International Search Report and Written Opinion received in PCT Application No. PCT/US2011/054045, Sep. 14, 2012, 9 pages.

Pirker et al., Towards a Virtual Trusted Platform, J. UCS 16.4 (2010): 531-542.

Taiwan Office Action issued in Appl. No. 101136225 mailed Jun. 30, 2014; 7 pages.

* cited by examiner

COMMUNICATION WITH A VIRTUAL TRUSTED RUNTIME BIOS

CROSS REFERENCE TO RELATED APPLICATIONS

This is a continuation of U.S. application Ser. No. 14/238,729, filed Aug. 19, 2014, which is a national stage application under 35 U.S.C. §371 of PCT/US2011/054045, filed Sep. 29, 2011, which claims priority to PCT Application No. PCT/US2011/049677, filed Aug. 30, 2011, all of which are hereby incorporated by reference in their entirety.

BACKGROUND

An electronic device, such as a computer or other type of device, can include a Basic Input/Output System (BIOS) that is responsible for starting up the electronic device. During startup, the BIOS initializes and configures components of the electronic device, and loads an operating system in the electronic device. In addition, the BIOS can also provide other services, such as a power management service, a thermal management service, a BIOS update service, and so forth.

BRIEF DESCRIPTION OF THE DRAWINGS

Some embodiments are described with respect to the following figures.

DETAILED DESCRIPTION

A Basic Input/Output System (BIOS) is usually the first code executed by an electronic device when the electronic device starts. Examples of the electronic device include a computer (e.g. desktop computer, notebook computer, tablet computer, server computer, etc.), a handheld device (e.g. personal digital assistant, smartphone, etc.), an electronic appliance, a gaming console, or any other type of electronic device. The BIOS initializes and configures various hardware components of the electronic device, and loads and starts an operating system (OS) of the electronic device. Code for the BIOS is usually stored on a non-volatile memory, such as a flash memory device or other type of programmable read-only memory (ROM).

Although various example BIOS functions are listed above, it is noted that other or alternative BIOS functions can be used in other implementations.

In accordance with some implementations, for more robust system behavior, functions of the BIOS can be provided in a virtual trusted runtime BIOS of the electronic device which may be in the privileged domain, where the privileged domain is a domain of the electronic device that is relatively secure and that has certain predefined privilege(s) not available to other entities in the electronic device. Generally, a "privileged domain" refers to a domain that has predefined privilege(s) that allows an entity in the domain to perform functions in the electronic device that other entities (e.g. OS, application programs, etc.) are not allowed to perform. Also, a privileged domain also has a security mechanism to protect the privileged domain from unauthorized access or attack. Communication with the virtual trusted runtime BIOS may be by a web based protocol. A web based protocol may not be secure and could lead to security vulnerabilities. In one implementation, the communication can be secured by a public key and private key encryption such as a secure socket layer. Securing the communication to the virtual trusted runtime BIOS can be used to secure system management instructions to be handled by a system management mode (SMM).

Examples of a privileged domain include any or some combination of the following: domain 0, which is often the first domain started by a virtual machine monitor (also referred to as a hypervisor) to perform management tasks; a portion of the virtual machine monitor (or hypervisor); a guest virtual machine that has predefined settings to provide the guest virtual machine with enhanced privileges and/or security; or another type of domain in the electronic device with a predefined special privilege and/or security mechanism. The secured privileged domain can include the virtual trusted runtime BIOS which can include a virtual high-privilege mode for handling system management instructions securely without having to have a component on a peer level with the virtual machine monitor such as an system management mode transfer monitor to separate and secure a virtual high-privilege mode from the other domains.

A "virtual machine" (also referred to as a "virtual appliance" or "virtual partition") refers to some partition or segment of a physical machine (the electronic device) that is provided to virtualize or emulate a physical machine. From the prospective of a user or application, a virtual machine looks like a physical machine. A virtual machine includes an operating system (referred to as a guest operating system) and at least one application program.

A virtual machine monitor (VMM), also referred to as a hypervisor, manages the sharing, by the virtual machines, of the physical resources, including the hardware components, of the electronic device. The VMM virtualizes the physical resources. Each virtual machine has an associated virtualized physical resources managed by the VMM. The VMM processes requests for physical resources.

In one implementation, a computing system includes hardware and a virtual machine monitor. A virtual trusted runtime BIOS can be generated by the virtual machine monitor. A communication channel can communicate with the virtual trusted runtime BIOS. The communication channel is secured by a secure socket layer.

In another implementation, a method can secure communications with a virtual trusted runtime BIOS in a computing system. The method can include managing a virtual trusted runtime BIOS and establishing a secure communication channel to the virtual trusted runtime BIOS. After the secure communication channel is established, communicating with the virtual runtime BIOS over the secure communication channel using secure socket layers.

Figure 1:
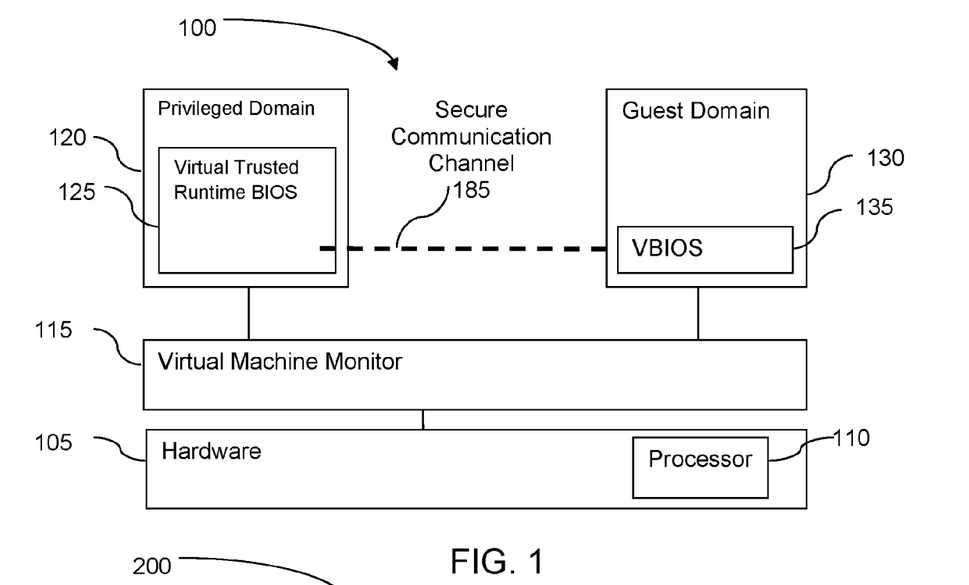
FIG. 1 is a block diagram of a computing system according to an example implementation of secure communication with a virtual trusted runtime BIOS.

With reference to the figures, FIG. 1 is a block diagram of a computing system according to an example implementation of secure communication with a virtual trusted runtime BIOS. A computing system 100 can include a processor 110. The processor 110 is part of the hardware 105 of the computing system 100. The processor 110 can be a general purpose processor or an application specific processor. As examples, the hardware 105 can also include: I/O devices, volatile memory, secondary storage, flash memory, a network interface controller, a graphics adapter, and so forth. The system can include a virtual machine monitor 115 to manage the physical resources of the hardware components and virtualize the physical resources. The computing system includes a virtual basic input output system (vBIOS) 135 attached to a guest domain 130. The guest domain 130 is a virtual machine which may execute an operating system such as Microsoft Windows, Linux, Unix, or another operating system.

In some examples, the privileged domain 120 is domain 0, which is an administrative domain started by the VMM 102 upon system startup, and which has enhanced privileges and security mechanisms. Examples of tasks performed by domain 0 include creating and configuring guest domains. Each of domain 0 and guest domains is considered a corresponding virtual machine. The privileged domain 120 can be separate from the VMM 115. In alternative implementations, the privileged domain 120 can be part of the VMM 115. In such alternative implementations, the virtual trusted runtime BIOS function 125 is part of the VMM 115. The privileged domain 120 can be a trusted domain as it is generated or managed by the trusted VMM 115.

The VMM 115 may be trusted because a key may be generated or unsealed by a trusted platform module (TPM) or other device which may include a virtual TPM, the BIOS or another device at initialization. The key may be used to trust the privileged domain 120. The key may be part of a certificate that is used to trust the VMM and thus the privileged domain 120 and the virtual trusted runtime BIOS. The key may be used as part of the certificate to generate an SSL communication. The key may be stored on the computing system at the time of manufacture or the key may be generated at runtime. The key may be an asymmetric key such as a public key or a private key.

The provision of the BIOS function 125 in the privileged domain 120 implements a "BIOS in a cloud," also referred to as "virtual trusted runtime BIOS 125" or BIOS.v. The "cloud" can refer to the privileged domain 120 (or some other trusted domain). The cloud can be located either in the computing system 100 or external of the computing system 100. For example, the cloud containing a virtual trusted runtime BIOS 125 function can be accessible by the computing system 100 over a network. The network may be for example a local, wide or worldwide network.

In some implementations, the web-based interface provided by a web-based network communication function is part of a service requestor-service provider model that allows the requestor (e.g. a domain) to request a service (e.g. BIOS service) from a provider (e.g. server computer) over a network. As examples, the web-based interface can be a web services interface. A web service refers to a mechanism designed to support interoperable machine-to-machine which may be virtual machine to virtual machine interaction over a network. The web services interface can be according to a format described by a Web Services Description Language (WSDL), as defined by the World Wide Web Consortium (W3C). Alternatively, the web services interface can be according to a Simple Object Access Protocol (SOAP) (also defined by the W3C), which is a protocol for exchanging structured information in the implementation of web services over networks.

As yet another alternative, the web-based interface can be according to a Representational State Transfer (REST) architecture, which includes clients and servers, where clients can submit requests to servers, and servers can provide responses to clients. Requests and responses are built around the transfer of representations of resources. A resource can be any coherent and meaningful concept that may be addressed. A representation of a resource is typically a document that captures the current or intended state of a resource. In the REST architecture, a request submitted by a client (e.g. the electronic device) can be a Hypertext Transfer Protocol (HTTP) Get request, in some examples. The server (e.g. server computer) can provide an HTTP response to the HTTP Get request. HTTP may include secure Hypertext Transfer Protocol (HTTPs).

In the web-based interface, a resource (e.g. the internal virtual trusted runtime BIOS function or external virtual trusted runtime BIOS function) can be accessed by issuing a virtual trusted runtime BIOS access request that contains an address of the requested resource. The address can be a web address, such as a Uniform Resource Locator (URL), an Internet Protocol (IP) address, Simple Mail Transfer Protocol (SMTP), or some other address that can uniquely identify the requested resource.

In response to the virtual trusted runtime BIOS access request containing the address that is received at the web-based interface, the web-based network communication function can direct the request to an appropriate one of the internal and external virtual trusted runtime BIOS functions. In some cases, the web-based network communication function can direct the request to both the internal and external virtual trusted runtime BIOS functions.

The web-based network communication with the virtual trusted runtime BIOS is secured by for example Secure Sockets Layer (SSL) which is a protocol for managing the security of a message transmission on the Internet. Since the communication with the BIOS is web-based communications such as those used on the internet a secure socket layer can be used to secure the communication with the virtual trusted runtime BIOS by creating a secure communications channel 185. Secure socket layer (SSL) may also may also mean Transport layer security (TLS) or any other security protocol for securing web-based communication.

A sockets method of passing data back and forth between a client and a server program in a network or between program layers in the same computer, therefore SSL can be used to secure the communications with the virtual trusted runtime BIOS if the virtual trusted runtime BIOS is hosted by a privileged domain for example or if hosted on a network somewhere else. SSL uses the public-and-private key encryption system, which also can include the use of a digital certificate.

An example of establishing the secure communications channel may include a domain, such as guest domain 130, making request to the virtual trusted runtime BIOS 125 to identify itself. The virtual trusted runtime BIOS 125 can then send a copy of an SSL certificate to the domain. The domain checks whether it trusts the SSL certificate and if the domain trusts the certificate the guest domain send a message to the virtual trusted runtime BIOS. The message from the guest domain to the virtual trusted runtime BIOS may include a session key seed that is encrypted with an SSL public key. The virtual trusted runtime BIOS 125 can then send back a digitally signed acknowledgement to the domain to start an SSL encrypted session. Encrypted data can now be shared between the domain and the virtual trusted runtime BIOS 125.

In another example of establishing the secure communication, the domain may include an SSL certificate and the domain may be asked to identify itself and the domain responds by sending a copy of the SSL certificate and which the virtual trusted runtime BIOS determines whether it trusts the certificate and sends a message to the domain. The message from the virtual trusted runtime BIOS 125 may include a session key which is encrypted with an SSL public key. The domain can send back a digitally signed acknowledgement to the virtual trusted runtime BIOS to start an SSL encrypted session, also resulting in sharing encrypted data between the domain and the virtual trusted runtime BIOS.

Figure 2:
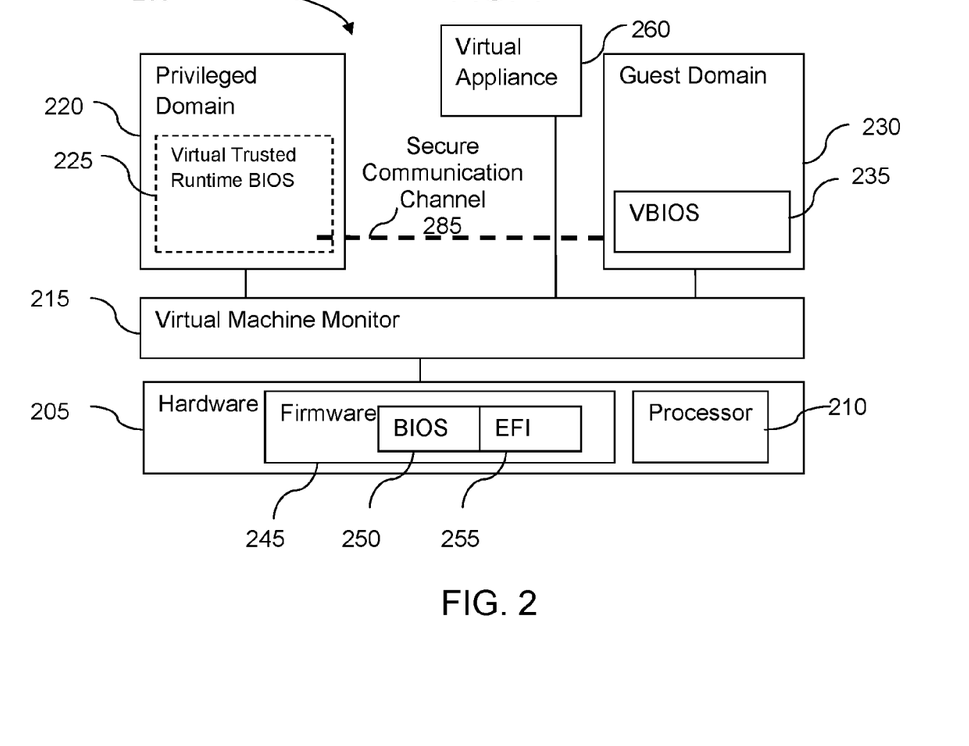
FIG. 2 is a block diagram of a computing system according to an example implementation of secure communication with a virtual trusted runtime BIOS.

FIG. 2 is a block diagram of a computing system according to an example implementation of a virtual high-privilege mode. A computing system 200 can include a processor 210. The processor 210 is part of the hardware 205 of the computing system 200. The hardware can include firmware 245 which may include the basic input/output system (BIOS) 250 and the extensible firmware interface (EFI) 255. The BIOS 250 may be referred to as a physical BIOS. A "physical BIOS" refers to BIOS code that resides in non-volatile memory such as flash memory or other programmable read/only memory, and which is to be executed upon startup of the computing system 200. In some implementation the physical BIOS may be a reduced (simplified) version of the BIOS since at least part of the system management mode is moved to the virtual trusted runtime BIOS 225. If a virtual trusted runtime BIOS 225 is implemented the physical BIOS 250 may remain unlocked to allow changes because of the trust attached to the virtual trusted runtime BIOS 225. The processor 210 can be a general purpose processor or an application specific processor. The system can include a virtual machine monitor VMM 215 to manage the physical resources of the hardware components and virtualize the physical resources. The computing system 100 includes a virtual basic input output system (vBIOS) 235 attached to a guest domain 230. The guest domain 230 is a virtual machine which may execute an operating system such as Microsoft Windows, Linux, Unix, or another operating system.

In some examples, the privileged domain 220 is domain 0, an administrative domain started by the VMM 215 upon system startup, which has enhanced privileges and security mechanisms. Examples of tasks performed by domain 0 include creating and configuring guest domains. Each of domain 0 and guest domains is considered a corresponding virtual machine. The privileged domain 220 can be separate from the VMM 215. In alternative implementations, the privileged domain 220 can be part of the VMM 215. In such alternative implementations, the virtual trusted runtime BIOS 225 is part of the VMM 215.

A secure communication channel 285 can be used to secure communications such as a system management request. A system management request can be sent by a web service's application programming interface (API). In another implementation the system management request can be packaged in a Windows management instrumentation (WMI) wrapper. Another implementation includes using a remote procedure call (RPC) to forward the system management request to the virtual system management mode.

In some implementations, BIOS in a cloud is based on the following premises of a VMM-based architecture: the physical BIOS knows and trusts the main runtime entity (VMM 215) that the physical BIOS is booting, and the BIOS-trusted VMM has the ability to trap and turn off all I/O requests (to access BIOS functionality) other than those coming from the privileged domain. In some implementations, a BIOS verification mechanism can be provided to authenticate the origin of the VMM that is to be booted by the computing system. Such verification mechanisms allow an administrator or other user to specify that only an authorized VMM can be booted in the computing system. The verification mechanism assures that the VMM image that is in the computing system has not been modified maliciously, and that the VMM can be trusted. The physical BIOS can visually verify the VMM image, and ensure that the VMM is booted with a known set of controlled operational settings that have previously been specified.

After verifying that an authorized VMM has been booted, the physical BIOS can then defer or omit execution of various security measures that the physical BIOS would normally perform to prevent corruption by unauthorized or malicious code. For example, the physical BIOS can choose to not lock BIOS flash registers and/or portions of flash memory.

In implementations in which the virtual trusted runtime BIOS 225 is provided internally in a computing system 200. From the perspective of a guest virtual machine or other entity of the computing system that wants to access BIOS services, the cloud including the BIOS services can be located anywhere, including in a location that is external of the computing system.

In one implementation with a virtual trusted runtime BIOS, no other domain than privileged domain or another trusted domain will be able to communicate with BIOS. This can be because all communication from a guest domain to the BIOS are trapped and routed to the privileged domain portion for the appropriate filter to receive and process. The virtual high-privilege mode in the privilege domain can then process the request and can make direct or indirect calls to the flash or the BIOS. This call from the privileged domain to the BIOS which will then be allowed by the hypervisor to go through since Hypervisor can detect a call originating from the privileged domain rather than a guest domain. Given open but exclusive access to the physical BIOS, the communication from the privileged domain to physical BIOS is secured, the privileged domain can now write or read all settings of BIOS at runtime eliminating a situation where the processor would enter system management mode.

Even though the virtual trusted runtime BIOS is secure, communication with the virtual trusted runtime BIOS may not be. To secure the web-based communication with the virtual trusted runtime BIOS a SSL handshake can occur between the virtual trusted runtime BIOS and a requesting domain for example such as the guest domain 230. In this example the virtual trusted runtime BIOS may include an SSL certificate such as one a web server would have and the requesting domain may use that certificate to secure the communication with the virtual trusted runtime BIOS such that the requesting domain operates similar to a web browser on a secure website.

Figure 3:
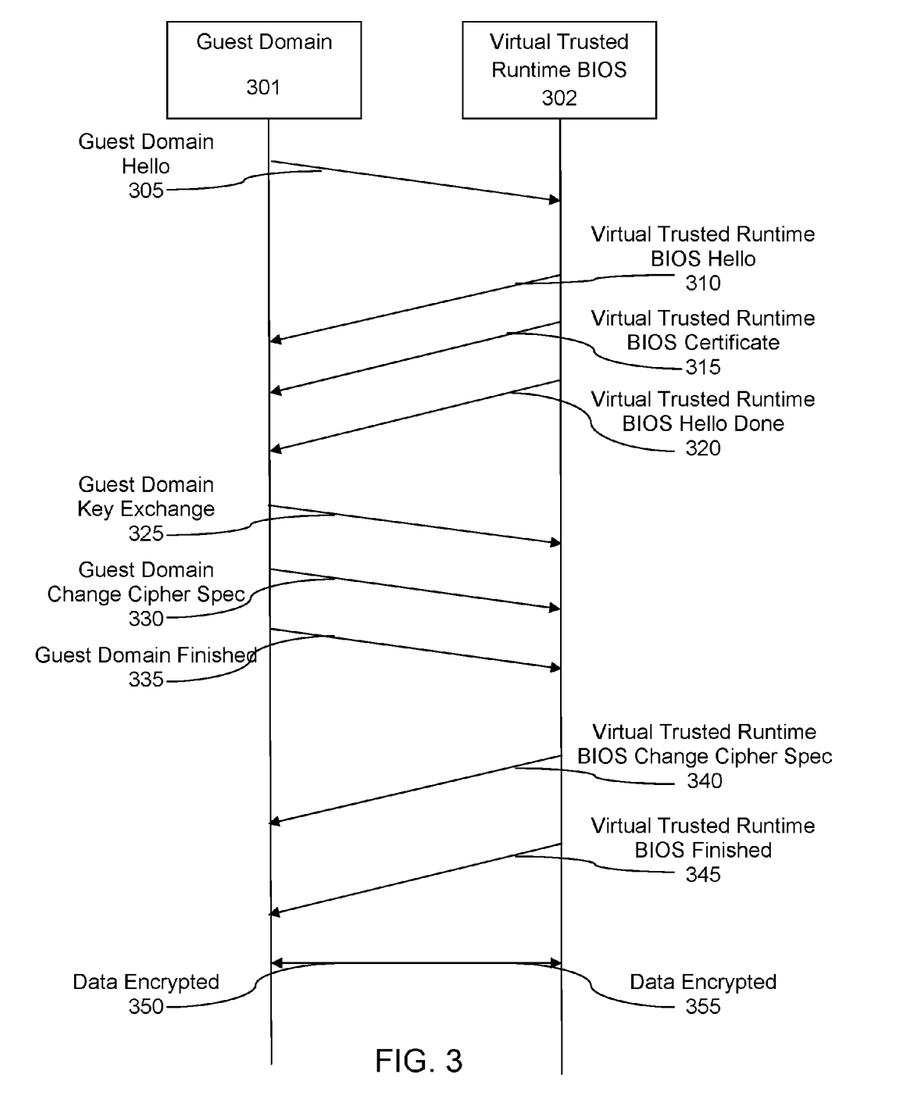
FIG. 3 is a flow diagram of a method of securing communications with a virtual trusted runtime BIOS according to an implementation.

FIG. 3 is a flow diagram of a method of securing communications with a virtual trusted runtime BIOS according to an implementation. To initiate a SSL communication between the guest domain 301 and the virtual trusted runtime BIOS 302 the guest domain says hello at 305. The virtual trusted runtime BIOS then says hello at 310. The virtual trusted runtime BIOS send its certificate to the guest domain at 315.

In some implementations the virtual trusted runtime BIOS may send a public key to the guest domain. The virtual trusted runtime BIOS may request the client certificate.

The virtual trusted runtime BIOS signals the guest domain that the Hello is done at 320. The guest domain then does a key exchange at 325 using the public key from the certificate provided by the virtual trusted runtime BIOS to exchange a session key. The session key will be used to setup symmetric encryption and communicated to the virtual trusted runtime BIOS using asymmetric encryption. The guest domain may provide a certificate if the virtual trusted runtime BIOS requests it and the guest domain has a certificate.

The guest domain can signal to the virtual trusted runtime BIOS that there is a change in the Cipher Spec and that the next communication from the guest domain will be encrypted at 330 using the session key. The guest domain signals that it is finished at 335 which is encrypted using the session key. The virtual trusted runtime BIOS can change cipher spec at 340 indicating that the next message is going to be encrypted using the session key. A finished message that is encrypted is sent by the virtual trusted runtime BIOS at 345. Encrypted data can be transferred back and forth between the guest domain and the virtual trusted runtime BIOS at 350 and 355.

Figure 4:
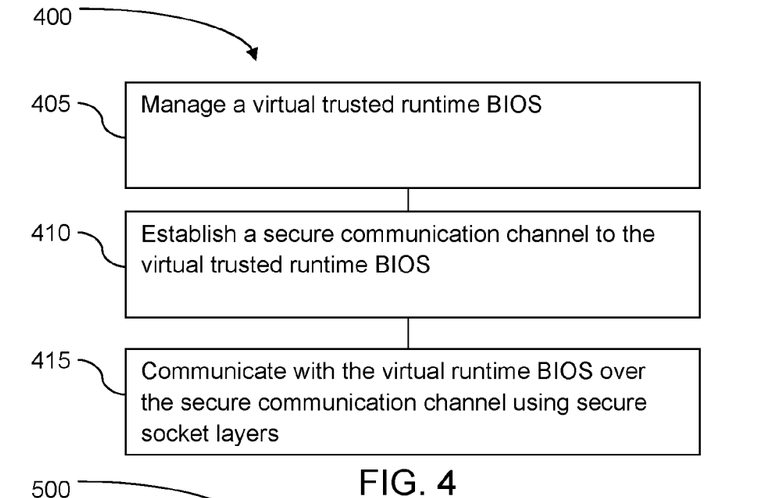
FIG. 4 is a flow diagram of a method of securing communications with a virtual trusted runtime BIOS according to an implementation.

FIG. 4 is a flow diagram of a method 400 of securing communications with a virtual trusted runtime BIOS according to an implementation. The method can begin by managing a virtual trusted runtime BIOS at 405. The virtual trusted runtime BIOS 125 can be managed by the virtual machine monitor 115. A secure communication channel can be established to the virtual trusted runtime BIOS at 410.

An example of establishing the secure communications channel may include a domain, such as guest domain 130, making request to the virtual trusted runtime BIOS 125 to identify itself. The virtual trusted runtime BIOS 125 can then send a copy of an SSL certificate to the domain. The domain checks whether it trusts the SSL certificate and if the domain trusts the certificate the guest domain send a message to the virtual trusted runtime BIOS. The message from the guest domain to the virtual trusted runtime BIOS may include a session key seed that is encrypted with an SSL public key. The virtual trusted runtime BIOS 125 can then send back a digitally signed acknowledgement to the domain to start an SSL encrypted session. Encrypted data can now be shared between the domain and the virtual trusted runtime BIOS 125.

In another example of establishing the secure communication, the domain may include an SSL certificate and the domain may be asked to identify itself and the domain responds by sending a copy of the SSL certificate and which the virtual trusted runtime BIOS determines whether it trusts the certificate and sends a message to the domain. The message from the virtual trusted runtime BIOS 125 may include a session key which is encrypted with an SSL public key. The domain can send back a digitally signed acknowledgement to the virtual trusted runtime BIOS to start an SSL encrypted session, also resulting in sharing encrypted data between the domain and the virtual trusted runtime BIOS.

The secure communication channel can be for example a web based communications protocol. Communication with the virtual trusted runtime BIOS is through a secure communication channel using secure socket layers at 415.

Figure 5:
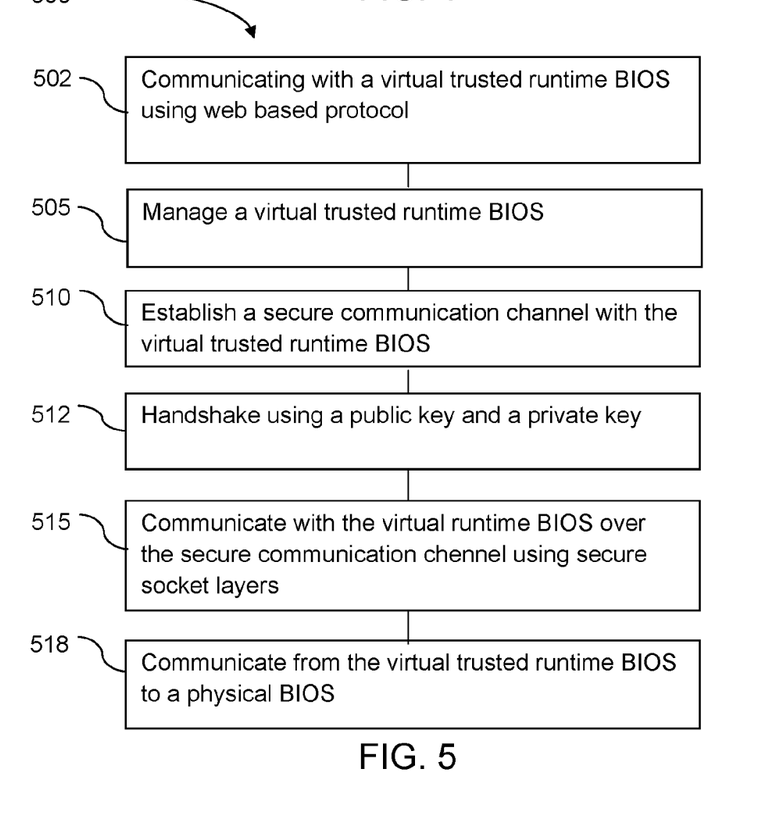
FIG. 5 is a flow diagram of a method of securing communications with a virtual trusted runtime BIOS according to an implementation.

FIG. 5 is a flow diagram of a method 500 of securing communications with a virtual trusted runtime BIOS according to an implementation. The method can begin by communicating with a virtual trusted runtime BIOS using web based protocol at 502. The virtual trusted runtime BIOS can be managed at 505 so that the virtual trusted runtime BIOS is a trusted component of the computing system 100. The virtual trusted runtime BIOS 125 can be managed by the virtual machine monitor 115. A secure communication channel can be established with the virtual trusted runtime BIOS at 510. The secure communication channel can be for example a web based communications protocol. A handshake using a public key and a private key can be used to secure the communication at 512. To secure the communication with the virtual trusted runtime BIOS a secure communication channel using secure socket layers is used for the communication with the virtual trusted runtime BIOS at 515. The virtual trusted runtime BIOS can communicate with a physical BIOS at 518 to change system configurations for example. In some implementations the virtual trusted runtime BIOS is located remotely from the computing system and the virtual machine monitor can route the communication to the virtual trusted runtime BIOS regardless of where the virtual trusted runtime BIOS is located.

Figure 6:
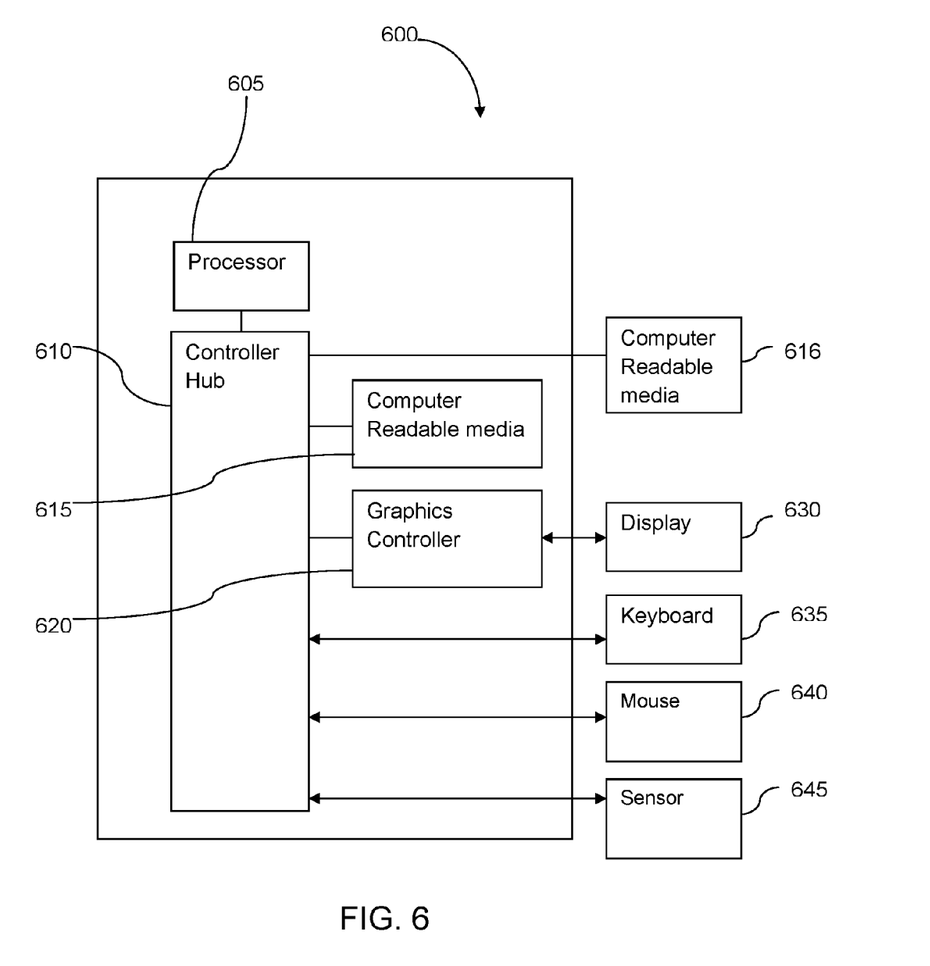
FIG. 6 is a block diagram of a computing system according to an example implementation of a computer readable medium.

FIG. 6 is a block diagram of a computing system 600 according to an example implementation of a computer readable media 615-616. The computer readable media 615-616 can include code that if executed by a processor 605 can cause a computing system to manage a communication with a virtual trusted runtime BIOS. The computer system can include hardware such as a controller hub 610, a graphics controller 620. The computer system may be connected to a display 630, keyboard 635, mouse 640, sensor 645, and other devices. The code can also establish a secure communication layer with the virtual trusted runtime BIOS. Communication with the virtual runtime BIOS can be over the secure communication channel using secure socket layers.

The computing system can also include code that if executed causes a computing system to communicate with a virtual runtime BIOS located remotely from the computing system. If the BIOS is located remotely from the computing system the component, such as a domain, making the request to the virtual runtime BIOS may not be aware that the BIOS is located remotely. The VMM may route the request without notifying the requesting component. The communicating with the virtual runtime BIOS can be by a web communication protocol whither the virtual runtime BIOS is located locally or remotely. The component may establish a secure communication channel including a handshake using a public key and a private key for example.

Various modules, such as those depicted in other figures, can be implemented as machine-readable instructions that can be executed on one or multiple processors. A processor can include a microprocessor, microcontroller, processor module or subsystem, programmable integrated circuit, programmable gate array, or another control or computing device.

The machine-readable instructions can be stored in machine-readable or computer-readable storage media, which can be implemented as one or multiple computer-readable or machine-readable storage media. The storage media can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A system comprising:
   hardware;
   a plurality of guest virtual machines, a first guest virtual machine of the plurality of guest virtual machines comprising a virtual basic input/output system (BIOS);
   a virtual machine monitor to manage sharing of the hardware by the plurality of guest virtual machines; and
   a communication channel, the first guest virtual machine to communicate with a virtual trusted runtime BIOS in a privileged domain over the communication channel according to a web-based protocol, wherein the communicating between the first guest virtual machine and the virtual trusted runtime BIOS over the communication channel is secured by a secure socket layer.

2. The system of claim 1, wherein the first virtual machine is to cause establishment of the communication channel that is secured by the secure socket layer by communicating a secure socket layer certificate between the first virtual machine and the virtual trusted runtime BIOS.

3. The system of claim 2, wherein the establishment of the communication channel secured by the secure socket layer comprises the first virtual machine:
   sending a request to the virtual trusted runtime BIOS, and
   receiving a secure socket layer certificate from the virtual trusted runtime BIOS responsive to the request.

4. The system of claim 2, wherein the establishment of the communication channel secured by the secure socket layer comprises the first virtual machine:
   sending a secure socket layer certificate to the virtual trusted runtime BIOS.

5. The system of claim 1, wherein the communication channel is between a Hypertext Transfer Protocol (HTTP) layer and Transport Control Protocol (TCP) layer.

6. The system of claim 1, wherein the privileged domain comprising the virtual trusted runtime BIOS is located remotely from the system, and wherein the first virtual machine is to communicate over a network with the virtual trusted runtime BIOS in the privileged domain.

7. The system of claim 1, wherein the first virtual machine is to access a resource of the virtual trusted runtime BIOS by issuing an access request containing a web address of the resource of the virtual trusted runtime BIOS.

8. The system of claim 1, wherein the privileged domain is a first privileged domain remote from the system and accessible over a network, the system further comprising: a second privileged domain comprising a virtual trusted runtime BIOS,
   wherein the first virtual machine is to issue an access request to access a virtual trusted runtime BIOS, and wherein the access request is directed to both the first privileged domain and the second privileged domain.

9. The system of claim 1, further comprising a physical BIOS,
   wherein the virtual machine monitor is to trap a request from the first virtual machine to the physical BIOS and to route the trapped request to the virtual trusted runtime BIOS of the privileged domain.

10. A method comprising:
    managing, by a system comprising a processor, a virtual trusted runtime basic input output system (BIOS) in a privileged domain;
    establishing, by the system, a secure communication channel between the virtual trusted runtime BIOS and a virtual machine that comprises a virtual BIOS;
    communicating, between the virtual trusted runtime BIOS and the virtual machine according to a web-based protocol over the secure communication channel using a secure socket layer.

11. The method of claim 10, wherein the virtual machine is located in a computing system, and the privileged domain is external of the computing system and accessible by the computing system over a network.

12. The method of claim 10, wherein the privileged domain is in a cloud.

13. The method of claim 10, wherein establishing the secure communication channel that is secured by the secure socket layer comprises communicating a secure socket layer certificate between the virtual trusted runtime BIOS and the virtual machine.

14. The method of claim 13, wherein establishing the communication channel secured by the secure socket layer comprises the privileged domain:
    receiving a request from the virtual machine, and
    sending a secure socket layer certificate responsive to the request to the virtual machine.

15. The method of claim 13, wherein establishing the secure communication channel secured by the secure socket layer comprises the privileged domain:
    receiving, from the virtual machine, a secure socket layer certificate.

16. The method of claim 10, further comprising receiving, by the virtual trusted runtime BIOS from the virtual machine, a request to access a resource of the trusted runtime BIOS, the received access request containing a web address of the resource of the trusted runtime BIOS.

17. The method of claim 16, wherein the web address comprises a Uniform Resource Locator (URL).

18. A non-transitory computer readable storage medium storing instructions that upon execution cause a system to:
    establish a secure communication channel between a first virtual machine of a plurality of virtual machines in the system and a virtual trusted runtime basic input output system (BIOS), the first virtual machine comprising a virtual BIOS; and
    communicate, between the first virtual machine and the virtual trusted runtime BIOS, over the secure communication channel according to a web-based protocol using a secure socket layer.

19. The non-transitory computer readable storage medium of claim 18, wherein the secure communication channel is established with the virtual trusted runtime BIOS in the privileged domain that is located remotely from the system and accessible by the system over a network.

20. The non-transitory computer readable storage medium of claim 18, wherein establishing the secure communication channel comprises exchanging a secure socket layer certificate between the first virtual machine and the virtual trusted runtime BIOS.

* * * * *

UNITED STATES PATENT AND TRADEMARK OFFICE
CERTIFICATE OF CORRECTION

PATENT NO.         : 9,535,710 B2
APPLICATION NO.    : 15/044758
DATED              : January 3, 2017
INVENTOR(S)        : Valiuddin Y. Ali et al.

Page 1 of 1

It is certified that error appears in the above-identified patent and that said Letters Patent is hereby corrected as shown below:

On the Title Page

In item (74), Attorney, in Column 2, Line 2, delete "Deparment" and insert -- Department --, therefor.

Signed and Sealed this
Twenty-third Day of May, 2017

Michelle K. Lee
*Director of the United States Patent and Trademark Office*